(12) United States Patent  
Eberhardt (10) Patent No.: US 6,404,339 B1  
(45) Date of Patent: Jun. 11, 2002

(54) RADIO FREQUENCY IDENTIFICATION TAG ARRANGED WITH A PRINTABLE DISPLAY

(75) Inventor: Noel H. Eberhardt, Cupertino, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/085,288

(22) Filed: May 27, 1998

Related U.S. Application Data (63) Continuation-in-part of application No. 09/045,357, filed on Mar. 20, 1998, and a continuation-in-part of application No. 09/041,480, filed on Mar. 12, 1998, now Pat. No. 6,040,773, and a continuation-in-part of application No. 09/031,848, filed on Feb. 27, 1998, and a continuation-in-part of application No. 08/540,813, filed on Oct. 11, 1995, now abandoned.

(51) Int. Cl.[7] .................................................. H04B 1/00
(52) U.S. Cl. .................. 340/572.1; 340/10.1; 340/10.3; 340/10.4; 340/10.32; 340/10.33; 340/10.34; 340/572.4; 340/572.5; 340/572.8; 343/700 MS
(58) Field of Search .............................. 340/10.1, 10.3, 340/10.4, 10.33, 10.34, 572.4, 572.5, 572.7, 10.32, 572.1, 572.8; 343/702, 700 MS (56) References Cited

U.S. PATENT DOCUMENTS

| | | |
|---|---|---|
| 3,843,036 A | 10/1974 | Monahan et al. |
| 4,783,646 A | 11/1988 | Matsuzaki |
| 4,818,855 A | 4/1989 | Mongeon et al. |
| 4,876,535 A | 10/1989 | Ballmer et al. |
| 4,900,386 A | 2/1990 | Richter-Jorgensen |
| 4,910,449 A | 3/1990 | Benge et al. |
| 4,970,495 A | 11/1990 | Matsumoto et al. |
| 5,051,741 A * | 9/1991 | Wesby .................... 340/825.49 |
| 5,081,445 A | 1/1992 | Gill et al. |
| 5,099,227 A | 3/1992 | Geiszler et al. |
| 5,175,418 A | 12/1992 | Tanaka |
| 5,288,235 A | 2/1994 | Sobhani |
| 5,430,441 A | 7/1995 | Bickley et al. |
| 5,442,334 A | 8/1995 | Gallo et al. |
| 5,446,447 A * | 8/1995 | Carney et al. ........... 340/572.4 |
| 5,528,222 A | 6/1996 | Moskowitz et al. |
| 5,566,441 A | 10/1996 | Marsh et al. |
| 5,673,037 A * | 9/1997 | Cesar et al. ............. 340/10.32 |
| 5,682,143 A | 10/1997 | Brady |
| 5,710,458 A | 1/1998 | Iwasaki |
| 5,786,626 A | 7/1998 | Brady |
| 5,847,447 A | 12/1998 | Rozin et al. |
| 5,854,480 A | 12/1998 | Noto |
| 6,001,211 A | 12/1999 | Hiroyuki |
| 6,040,773 A * | 3/2000 | Vega et al. .............. 340/572.1 |
| 6,118,426 A * | 9/2000 | Albert et al. ................. 340/5.2 |
| 6,144,301 A * | 11/2000 | Frieden ................... 340/572.8 |
| 6,173,899 B1 | 1/2001 | Rozin |
| 6,211,799 B1 | 4/2001 | Post et al. |

* cited by examiner

*Primary Examiner*—Brain Zimmerman  
*Assistant Examiner*—Yves DaLencourt  
(74) *Attorney, Agent, or Firm*—Wayne J. Egan; Terri S. Hughes (57) ABSTRACT

A radio frequency identification tag system (10) utilizes a radio frequency identification tag (16) that includes a display (40). The display has an electrooptic display (458) sandwiched between a first display electrode 454 and an optically transparent second display electrode (456). The electrooptic display is preferably formed by the print deposition of a microencapsulated electrophoretic material between the first display electrode and the second display electrode.

19 Claims, 3 Drawing Sheets

RADIO FREQUENCY IDENTIFICATION TAG ARRANGED WITH A PRINTABLE DISPLAY

CROSS-REFERENCE TO RELATED APPLICATIONS

This is a continuation-in-part of commonly-assigned prior U.S. patent application Ser. No. 08/540,813, filed Oct. 11, 1995 by Ted Geiszler et al., which is now abandoned, entitled "Remotely powered electronic tag and associated exciter/reader and related method," the disclosure of which prior application is hereby incorporated by reference, verbatim and with the same effect as though it were fully and completely set forth herein.

Also, this is a continuation-in-part of commonly-assigned prior U.S. patent application Ser. No. 09/031,848, filed Feb. 27, 1998 by Victor Allen Vega et al., which is still pending, entitled "Radio frequency identification tag system using tags arranged for coupling to ground," the disclosure of which prior application is hereby incorporated by reference, verbatim and with the same effect as though such disclosure were fully and completely set forth herein.

Also, this is a continuation-in-part of commonly-assigned prior U.S. patent application Ser. No. 09/041,480, filed Mar. 12, 1998 by Victor Allen Vega et al., which is now U.S. Pat. No. 6,040,773, entitled "Radio frequency identification tag arranged for magnetically storing tag state information," the disclosure of which prior application is hereby incorporated by reference, verbatim and with the same effect as though such disclosure were fully and completely set forth herein.

Also, this is a continuation-in-part of commonly-assigned prior U.S. patent application Ser. No. 09/045,357, filed Mar. 20, 1998 by Victor Allen Vega, which is still pending, entitled "Radio frequency identification tag with a programmable circuit state," the disclosure of which prior application is hereby incorporated by reference, verbatim and with the same effect as though such disclosure were fully and completely set forth herein.

FIELD OF THE INVENTION

The present invention relates generally to the field of radio-frequency identification tags including, but not limited to, radio frequency identification tags having a printable display.

BACKGROUND OF THE INVENTION

Radio frequency identification tags and radio frequency identification tag systems are known, and find numerous uses. For example, radio frequency identification tags are frequently used for personal identification in automated gate sentry applications protecting secured buildings or areas. Information stored on the radio frequency identification tag identifies the person seeking access to the secured building. Older systems require the person accessing the building to insert or swipe a programmed identification tag into or through a reader for the system to read the information from the identification tag. A radio frequency identification tag conveniently reads the information from the radio frequency identification tag at a small distance using radio frequency (RF) data transmission technology eliminating the inserting or swiping operation. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, responsive to the excitation signal, communicates the stored information from the radio frequency identification tag to the base station, which receives and decodes the information. The read information is communicated to the security system and, if appropriate, access is granted to the individual. In general, radio frequency identification tags are capable of retaining and, in operation, transmitting a substantial amount of information—sufficient information to uniquely identify individuals, packages, inventory and the like.

A typical technology for powering and reading a radio frequency identification tag is inductive coupling or a combination of inductive power coupling and capacitive data coupling. Inductive coupling requires incorporating a coil element into the radio frequency identification tag. The coil element is excited (or "energized") by an excitation signal from a base station to provide power to the radio frequency identification tag circuitry. The radio frequency identification tag coil, or a second tag coil, may be used to transmit and receive the stored information between the radio frequency identification tag and the base station. Inductive coupling technology is relatively expensive, particularly for applications where it may be desirable to have a disposable radio frequency identification tag such as in an inventory management application. Radio frequency identification tags relying on inductive coupling are also sensitive to orientation of the radio frequency identification tag with respect to the base station since the field created by the excitation signal must intersect the coil element at substantially a right angle for effective coupling. Furthermore, read ranges for inductively coupled devices are generally on the order of several centimeters. Longer read distances are desirable, and for certain applications, such as electronic animal identification, baggage tracking, parcel tracking and inventory management applications, are necessary.

The radio frequency identification tag systems and radio frequency identification tags disclosed in the above cross-referenced applications provide for substantially increased read/write distances over those available in the prior art. An advantage derived from the use of the systems and tags therein disclosed is that the user need not bring the radio frequency identification tag in close proximity to a base station or to substantially orient the tag with respect to the base station. It is therefore possible to incorporate the antenna elements of the base station into, for example, a doorway or a vestibule and to energize the tag and read the tag information at a greater distance. A user passing through the doorway need not be concerned with moving the radio frequency identification tag into close proximity to the base station.

In some systems, the base station is arranged to include a visual or audio alert, or potentially both alert types, to allow the user to know that a successful reading and/or writing of the tag information has occurred. With the advent of the above-described improvements in read/write distances the tag is no longer brought into close proximity with the base station. Hence, the user's attention is not drawn to the base station such that an alert co-located therewith is not effective for signally the user that a read/write operation has transpired. Moreover, antennae associated with the base station may be integrated into the structure of the doorway or vestibule and the actual base station electronics may be remotely located therefrom.

It has been suggested to provide a visual alert, in the form of a display, as part of the radio frequency identification tag. The task is much easier said than done. Display devices typically have high power consumption, and a remotely powered radio frequency identification tags operate under substantial power constraints. Additionally, it is the goal to make the components of the radio frequency identification tag as small as possible with a completed tag, for example, being no larger than a typical credit card. Display devices tend to be rather large. Still, with remote location of base station components and substantially increased read distances, it is desirable to integrate a display or other visual alert into the radio frequency identification tag to assist the user in its operation.

Thus, there is a need for an improved radio frequency identification tag.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Radio frequency identification tag systems in accordance with preferred embodiments of the present invention utilize radio frequency identification tags having a display. In a preferred embodiment of the present invention, the display is arranged to be directly responsive and indicative of the presence of an excitation signal. In an alternate preferred embodiment of the present invention, the display is arranged to be responsive to signals from the radio frequency identification tag circuit chip. The radio frequency identification tag may, in a preferred embodiment, have electrodes arranged for coupling to ground. In an alternate preferred embodiment of the present invention, the radio frequency identification tag may have magnetically programmable electrodes. In still another alternate preferred embodiment of the present invention, the radio frequency identification tag may be arranged with a programmable tag circuit state.

Figure 1:
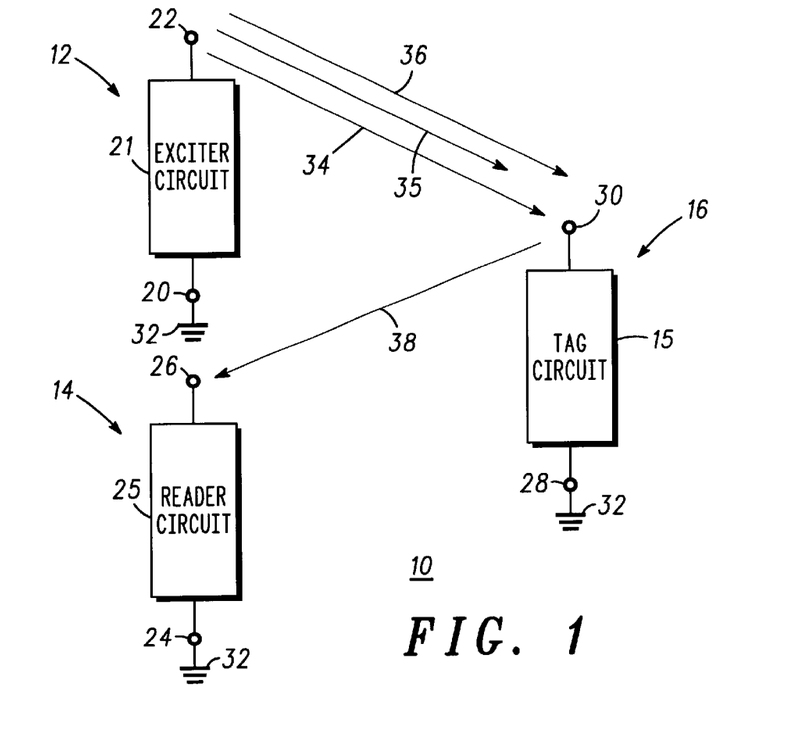
FIG. 1 is a block diagram illustration of a radio frequency identification tag system in accordance with a preferred embodiment of the present invention.

An apparatus in accordance with a preferred embodiment of the present invention is shown in FIG. 1 of the drawings. More particularly, a radio frequency identification tag system 10 includes: 1) a proximately-located electrostatic exciter 12, 2) a proximately-located electrostatic reader 14 and 3) a radio frequency identification tag 16. Electrostatic exciter 12 includes an exciter common electrode 20 and an exciter antenna element 22 coupled to an exciter circuit 21. Electrostatic reader 14 includes a reader common electrode 24 and a reader antenna element 26 coupled to a reader circuit 25. Radio frequency identification tag 16 includes a tag common electrode 28 and a tag antenna element 30 coupled to a tag circuit 15. In the preferred implementation of the invention shown, exciter common electrode 20, reader common electrode 24 and tag common electrode 28 are coupled to ground 32.

Electrostatic exciter 12 provides an exciter signal 34. When radio frequency identification tag 16 is proximate electrostatic exciter 12, exciter signal 34 is electrostatically coupled, through the air, from exciter antenna element 22 to tag antenna element 30. Radio frequency identification tag 16 becomes energized based upon exciter signal 34. In accordance with the tag circuit 15 and stored tag information of radio frequency identification tag 16, radio frequency identification tag 16 generates a read signal 38 containing some or all of the stored tag information, which is communicated from tag circuit 15 to tag antenna element 30. Read signal 38 is electrostatically coupled from tag antenna element 30 to reader antenna element 26. Electrostatic reader 14 receives read signal 38, demodulates/decodes read signal 38 to recover the stored tag information therefrom and, as appropriate, communicates the stored tag information to other system elements (not shown). In a preferred implementation, read signal 38 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 12 may be advantageously constructed from available tag exciter circuitry, such as for example, Motorola Indala's ASR-120 base station (part no. 05200-006 available from Motorola Indala Corporation, 3041 Orchard Parkway, San Jose, Calif. 95134). The ASR-120 device is adapted by forming and coupling a suitable exciter electrode, for example a copper plate electrode, to one of the dipole electrode connections thereby forming the exciter antenna element 22. The other dipole electrode connection is coupled to earth thereby forming exciter common electrode 20. As the ASR-120 is also adaptable to receive from a radio frequency identification tag the read signal, one will appreciate that it may be further adapted to include the reader antenna element coupled to the read electrode connection.

Figure 2:
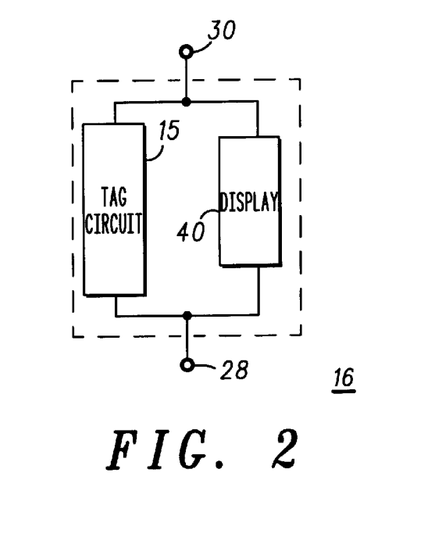
FIG. 2 is a block diagram illustration of a radio frequency identification tag for use in a radio frequency identification tag system, such as the system shown in FIG. 1, and in accordance with a preferred embodiment of the present invention.

With reference to FIG. 2, radio frequency identification tag 16 includes tag circuit 15 and a display 40. In a read/write embodiment of radio frequency identification tag 16, tag circuit 15 is advantageously constructed from a TEMIC e5550 circuit chip (available from Temic North America, Inc., Basking Ridge, N.J.). In this regard, tag circuit 15 includes suitable circuitry (not shown) for: 1) providing a source of direct current electrical power, 2) providing a clock signal, 3) decoding write signals, 4) storing data, including stored tag information, 5) generating a carrier signal and/or modulating a signal and 6) controlling the operation of tag circuit 15. Tag common electrode 28 and tag antenna element 30 are coupled directly to tag circuit 15. As seen in FIG. 2, tag common electrode 28 and tag antenna element 30 are also coupled directly to display 40. In this arrangement, display 40 is directly responsive to the presence of exciter signal 34 to provide a visual indication of the presence thereof. In an alternate, read only embodiment, the Indala 1341 circuit chip available from the aforementioned Motorola Indala Corporation may be used for tag circuit 15, and in which case, a write signal decoding operation is omitted.

Tag common electrode 28 is arranged to couple to ground. In a preferred embodiment (not shown), tag common electrode 28 may be arranged to couple to a person or an animal. In this manner, tag common electrode 28 is coupled to ground by means of the person or animal. Tag common electrode 28 may also be arranged to couple to an article (not shown). In this manner, tag common electrode 28 is coupled to ground by means of the article. In preferred applications, the article may be a loaned, leased or rented article, such as, for example, a video medium, an audio medium, a computer program, a computer game, a video game or a book. The article may also be a retail sales article.

With reference to FIG. 1 and FIG. 2, in a read/write embodiment, electrostatic exciter 12 is arranged to transmit a transmitted write signal 36 to radio frequency identification tag 16. Most preferably, transmitted write signal 36 is a modulation of exciter signal 34. Within tag circuit 15, write signal 36 is decoded to recover the write information and a write operation is initiated. For example, the write signal may contain information from which the stored tag information is to be updated. In this case, the updated stored tag information then forms the basis for read signal 38. It will be appreciated that the transmitted write signal 36 may also be an operation code or command, and tag circuit 15 decodes and operates on the operation code or command.

In a preferred embodiment of the present invention, radio frequency identification tag 16 may be arranged to include a programmable tag circuit state. Tag antenna element 30 is arranged for receiving an "on/off" command signal 35 from electrostatic exciter 12. Tag circuit 15 is arranged for setting the tag circuit state based upon "on/off" command signal 35. Preferably the tag circuit state is exactly one state of an "on" state and an "off" state. When the tag circuit state is "on", tag circuit 15 is arranged to generate the read signal containing the carrier signal and to couple the read signal to tag antenna element 30. When the tag circuit state is "off", tag circuit 15 ceases to generate the read signal.

A first state of the two states may indicate that an article is authorized for removal from the secured area while a second of the two states may indicate that the article is unauthorized for removal from the secured area. The programmed nature of the tag circuit state permits high sensitivity detection. That is, radio frequency identification tag system 10 may be arranged to quickly detect the "on/off" state of the tag circuit based on generation of the read signal, i.e., the presence of the carrier signal in the read signal, without attempting to decode the read signal. Under general operation, the stored tag electrode status information within radio frequency identification tag 16 is used for asset identification and/or inventory control. For EAS, the high sensitivity detection of the programmed tag circuit state provides effective article security.

In accordance with preferred embodiments of the present invention, one or both of the tag common electrode 28 and the tag antenna element 30 may also be arranged for magnetically storing tag electrode status information. The tag electrode status information is representative of exactly one state of two possible states. In this regard, one or both of the tag common electrode 28 and the tag antenna element 30 is formed from a magnetic strip. The magnetic strip is preferably a single bit EAS magnetic strip—a suitable magnetic strip material being a magnetic strip material sold by 3M under the product name "Tattle Tape." The magnetic strip is arranged as a single bit EAS strip for storing the magnetically programmable tag electrode status information. The magnetic strip is further arranged, as appropriate, as an effective tag common electrode 28 and/or a tag antenna element 30 for operation as described. In such an arrangement, it will be appreciated that radio frequency identification tag system 10 would include a suitable proximately-located magnetic reader for operation as is known in the art. As described above with respect to the programmable tag circuit states, the tag electrode status information may be effectively utilized for electronic article surveillance.

Figure 3:
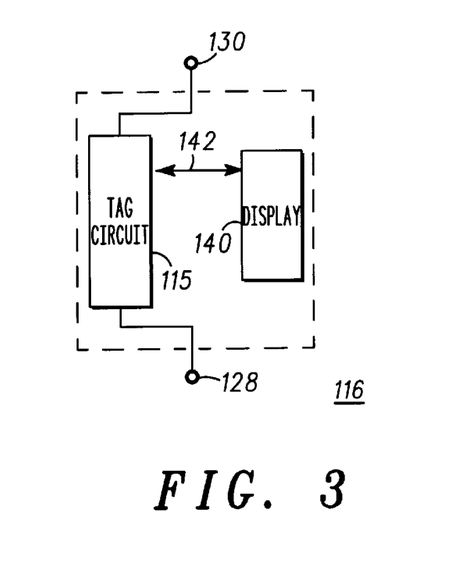
FIG. 3 is a block diagram illustration of a radio frequency identification tag for use in a radio frequency identification tag system, such as the system shown in FIG. 1, and in accordance with an alternate preferred embodiment of the present invention.

Referring now to FIG. 3, a radio frequency identification tag 116 in accordance with an alternate preferred embodiment of the present invention is shown. Radio frequency identification tag 116 is preferably arranged for operation in radio frequency identification tag system 10 and includes a tag common electrode 128 and a tag antenna element 130. Tag common electrode 128 is arranged for coupling to ground. Radio frequency identification tag 116 also includes a tag circuit 115, which in a read/write embodiment may be the aforementioned TEMIC e5550 circuit chip or in a read only embodiment may be the aforementioned Indala 1341 circuit chip. Tag circuit 115 is directly coupled to each of tag common electrode 128 and tag antenna element 130 and operates as described with respect to tag circuit 15. Radio frequency identification tag 116 also includes a display 140. Display 140, is coupled to receive signals from tag circuit 115 via conductor 142. Preferably display 140 is a matrix addressable display device and conductor 142 incorporates a suitable number of conductors and/or a voltage variant signal for matrix addressing display device 140. In this regard, display 140 is arranged to provide visual signals indicative of any number of radio frequency identification tag operating states, including without limitation, tag energization, read signal processing, write signal processing, error, and the like.

Figure 4:
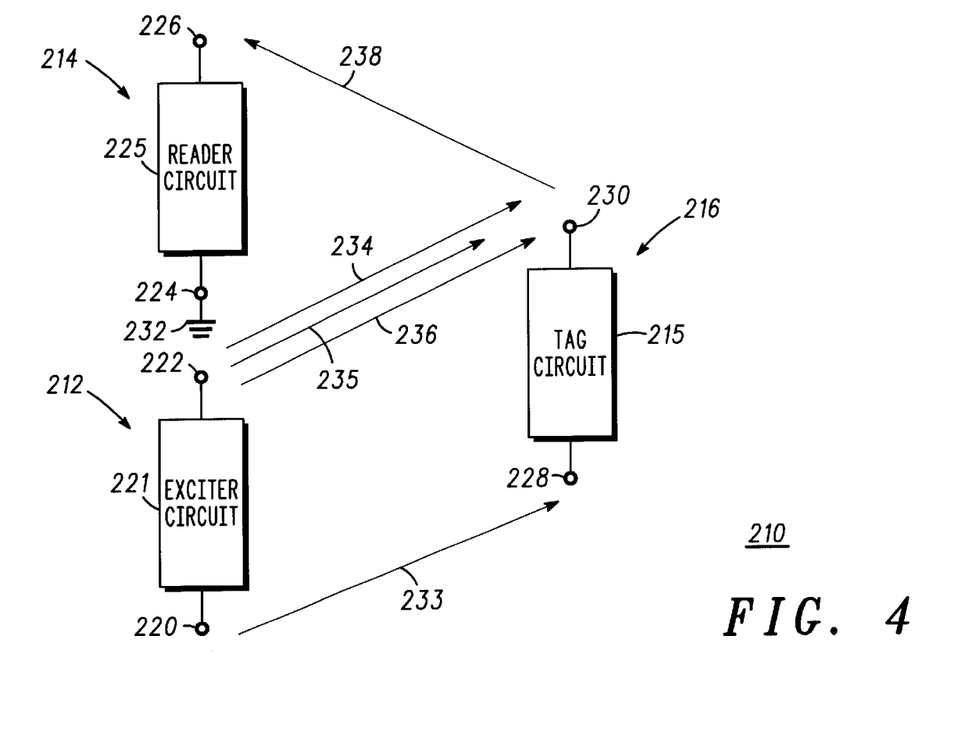
FIG. 4 is a block diagram illustration of a radio frequency identification tag system in accordance with an alternate preferred embodiment of the present invention.

Referring now to FIG. 4, a radio frequency identification tag system 210 includes 1) a proximately-located electrostatic exciter 212, 2) a proximately-located electrostatic reader 214 and 3) a radio frequency identification tag 216. Electrostatic exciter 212 includes a first exciter antenna element 220 and second exciter antenna element 222 coupled to an exciter circuit 221. Electrostatic reader 214 includes a reader common electrode 224 and a reader antenna element 226 coupled to a reader circuit 225. Radio frequency identification tag 216 includes a first tag antenna element 228 and a second tag antenna element 230 coupled to a tag circuit 215. In the preferred implementation of the invention shown, reader common electrode 224 is coupled to ground 232. First tag antenna element 228 and second tag antenna element 230 are arranged for electrostatically coupling an exciter signal 233 and an exciter signal 234 from first exciter antenna element 220 and second exciter antenna element 222, respectively.

More particularly, electrostatic exciter 212 provides an exciter signal 233 and an exciter signal 234. When radio frequency identification tag 216 is proximate electrostatic exciter 212, exciter signal 233 is electrostatically coupled, through the air, between first exciter antenna element 220 and first tag antenna element 228 and exciter signal 234 is electrostatically coupled between exciter antenna element 222 and tag antenna element 230. Tag circuit 215 becomes energized based upon exciter signal 233 and exciter signal 234. In accordance with the stored tag information of radio frequency identification tag 216, tag circuit 215 generates a read signal 238 containing some or all of the stored tag information, which is communicated from tag circuit 215 to second tag antenna element 230. Read signal 238 is sent electrostatically from second tag antenna element 230 to reader antenna element 226. Electrostatic reader 214 receives read signal 238, demodulates/decodes read signal 238 to recover the stored tag information therefrom and, as appropriate, communicates the stored tag information to other system elements (not shown). In a preferred implementation, read signal 238 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 212 may be advantageously constructed from available tag exciter circuitry, such as for example, the aforementioned Motorola Indala Corporation's ASR-120 base station. The ASR-120 device is adapted by forming and coupling a suitable exciter electrode, for example a copper plate electrode, to each of the dipole electrode connections, thereby forming first exciter antenna element 220 and second exciter antenna element 222. As the ASR-120 is also adaptable to receive from a radio frequency identification tag the stored tag information, one will appreciate that it may be further adapted to include the reader antenna element 226 coupled to the read electrode connection.

Radio frequency identification tag 216 may be arranged for attaching to an article (not shown). In preferred applications, the article may be a loaned, leased or rented article such as, for example, a video medium, an audio medium, a computer program, a computer game, a video game or a book. The article may also be a retail sales article. Radio frequency identification tag 216 may also be arranged for attaching to a person or an animal (not shown).

Figure 5:
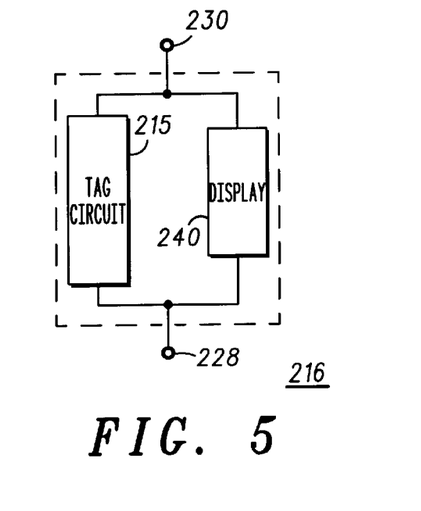
FIG. 5 is a block diagram illustration of a radio frequency identification tag for use in a radio frequency identification tag system, such as the system shown in FIG. 4, and in accordance with an alternate preferred embodiment of the present invention.

With reference to FIG. 5, radio frequency identification tag 216 includes tag circuit 215 and a display 240. In a read/write embodiment of the present invention within radio frequency identification tag 216, tag circuit 215 is advantageously constructed from a TEMIC e5550 circuit chip (available from Temic North America, Inc., Basking Ridge, N.J.). In this regard, tag circuit 215 includes suitable circuitry (not shown) for: 1) providing a source of direct current electrical power, 2) providing a clock signal, 3) decoding write signals, 4) storing data, including stored tag information, 5) generating a carrier signal and/or modulating a signal and 6) controlling the operation of tag circuit 215. First tag antenna element 228 and second tag antenna element 230 are coupled directly to tag circuit 215. As seen in FIG. 5, tag first antenna element 228 and tag second antenna element 230 are also coupled directly to display 240. In this arrangement, display 240 is directly responsive to the presence of exciter signal 234 to provide a visual indication of the presence thereof. In an alternate, read only embodiment, the Indala 1341 circuit chip available from the aforementioned Motorola Indala Corporation may be used for tag circuit 215, and in which case, a write signal decoding operation is omitted.

With reference to FIG. 4 and FIG. 5, in a read/write embodiment, electrostatic exciter 212 is arranged to transmit a transmitted write signal 236 to radio frequency identification tag 216. Most preferably, transmitted write signal 236 is a modulation of exciter signal 234. Within tag circuit 215, write signal 236 is decoded to recover the write information and a write operation is initiated. For example, the write signal may contain information from which the stored tag information is to be updated. In this case, the updated stored tag information then forms the basis for read signal 238. It will be appreciated that the transmitted write signal 236 may also be an operation code or command, and tag circuit 215 decodes and operates on the operation code or command.

In a preferred embodiment of the present invention, radio frequency identification tag 216 may be arranged to include a programmable tag circuit state. Tag second antenna element 230 is arranged for receiving an "on/off" command signal 235 from electrostatic exciter 212. Tag circuit 215 is arranged for setting the tag circuit state based upon "on/off" command signal 235. Preferably the tag circuit state is exactly one state of an "on" state and an "off" state. When the tag circuit state is "on", tag circuit 215 is arranged to generate the read signal containing the carrier signal and to couple the read signal to tag second antenna element 230. When the tag circuit state is "off", tag circuit 215 ceases to generate the read signal.

A first state of the two states may indicate that an article is authorized for removal from the secured area while a second of the two states may indicate that the article is unauthorized for removal from the secured area. The programmed nature of the tag circuit state permits high sensitivity detection. That is, radio frequency identification tag system 210 may be arranged to quickly detect the "on/off" state of the tag circuit based on generation of the read signal, i.e., the presence of the carrier signal in the read signal, without attempting to decode the read signal. Under general operation, the stored tag electrode status information within radio frequency identification tag 216 is used for asset identification and/or inventory control. For EAS, the high sensitivity detection of the programmed tag circuit state provides effective article security.

In accordance with preferred embodiments of the present invention, one or both of the first tag antenna element 228 and the second tag antenna element 230 may also be arranged for magnetically storing tag electrode status information. The tag electrode status information is representative of exactly one state of two possible states. In this regard, one or both of the first tag antenna element 228 and second tag antenna element 230 is formed from a magnetic strip. The magnetic strip is preferably a single bit EAS magnetic strip—a suitable magnetic strip material being a magnetic strip material sold by 3M under the product name Tattle Tape. The magnetic strip is arranged as a single bit EAS strip for storing the magnetically programmable tag electrode status information. The magnetic strip is further arranged, as appropriate, as an effective first tag antenna element 228 and/or a second tag antenna element 230 for operation as described. In such an arrangement, it will be appreciated that radio frequency identification tag system 210 would include a suitable proximately-located magnetic reader for operation as is known in the art. As described above with respect to the programmable tag circuit states, the tag electrode status information may be effectively utilized for electronic article surveillance.

Figure 6:
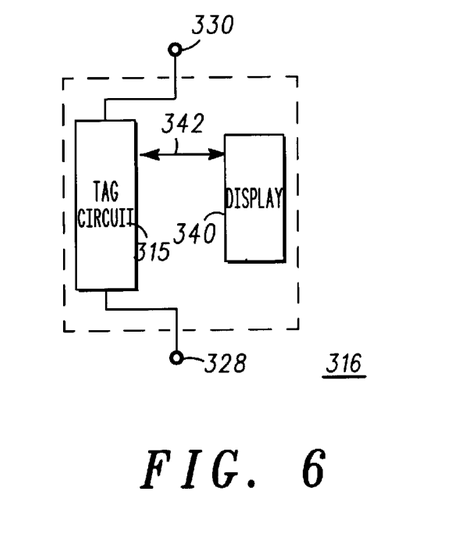
FIG. 6 is a block diagram illustration of a radio frequency identification tag for use in a radio frequency identification tag system, such as the system shown in FIG. 4, and in accordance with an alternate preferred embodiment of the present invention.

Referring now to FIG. 6, a radio frequency identification tag 316 in accordance with an alternate preferred embodiment of the present invention is shown. Radio frequency identification tag 316 is preferably arranged for operation in radio frequency identification tag system 210 and includes a first tag antenna element 328 and a second tag antenna element 330. Radio frequency identification tag 316 also includes a tag circuit 315, which in a read/write embodiment may be the aforementioned TEMIC e5550 circuit chip or in a read only embodiment may be the aforementioned Indala 1341 circuit chip. Tag circuit 315 is directly coupled to each of first tag antenna element 328 and second tag antenna element 330 and operates as described with respect to tag circuit 215. Radio frequency identification tag 316 also includes a display 340. Display 340, is coupled to receive signals from tag circuit 315 via conductor 342. Preferably display 340 is a matrix addressable display device and conductor 342 incorporates a suitable number of conductors and/or a voltage variant signal for addressing display 340. In this regard, display 340 is arranged to provide visual signals indicative of any number of radio frequency identification tag operating states, including without limitation, tag energization, read signal processing, write signal processing, error, and the like.

Figure 7:
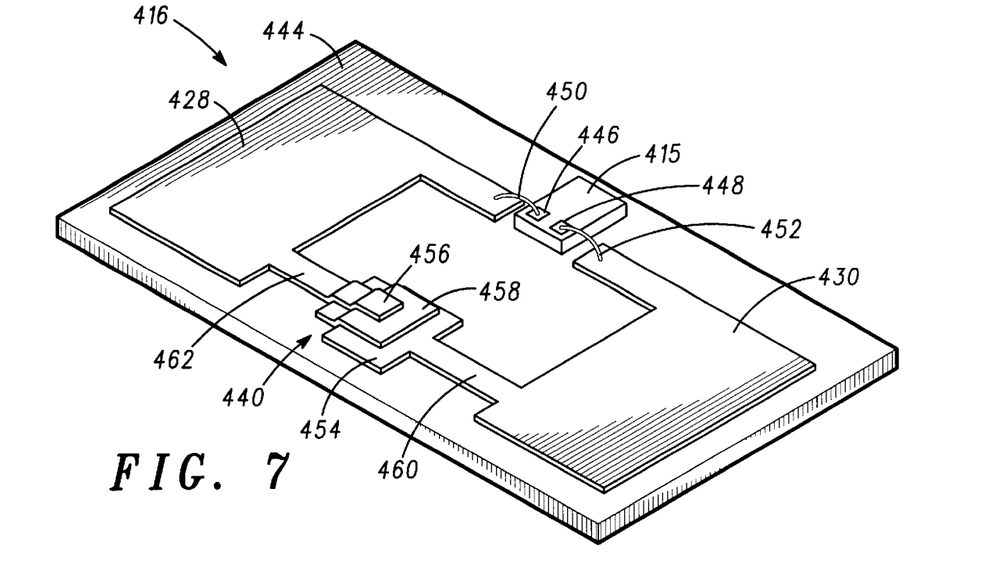
FIG. 7 is a schematic illustration of a radio frequency identification tag in accordance with a preferred embodiment of the present invention.

Referring now to FIG. 7, a radio frequency identification tag 416 is shown to include a preferred arrangement for a display 440. It will be appreciated that the arrangement of display 440 shown in FIG. 7 may be adapted for use, as appropriate, in each of the above described radio frequency identification tags 16 and 216. As seen in FIG. 7, radio frequency identification tag 416 includes a substrate 444 to which a tag circuit 415 is secured such as by bonding. Tag circuit 415 is coupled respectively to a first tag antenna element 428 and a second tag antenna element 430 via conductive pad 446 and conductor 450 and conductive pad 448 and conductor 452, respectively, for electrostatically coupling an excitation signal from an electrostatic tag exciter and for generating and electrostatically sending a read signal to an electrostatic tag reader. In this regard, operation of radio frequency identification tag 416 is as heretofore described. Preferably each of first tag antenna element 428 and second tag antenna element 430 are printed onto substrate 444 using a suitable printing technique, such as screen or ink jet printing, and a conductive printable medium, such as conductive ink.

Display 440 is preferably a non-emissive display, which may also be printed onto substrate 444. As seen in FIG. 7, display 440 preferably includes a first display electrode 454 printed onto substrate 444. First display electrode may be a suitable printable conductive medium such as conductive ink. Printed onto first display electrode 454 is a printable electrooptic display 458. Electrooptic display 458 may be a layer of electrophoretic display microcapsules print-deposited onto first display electrode 454. Sandwiching electrooptic display 458 is a second display electrode 456. Second display electrode 456 is formed from a printable optically transparent conductive medium, such as an indium tin oxide (ITO) ink. Other suitable materials for forming electrooptic display 458 include encapsulated micromagnetic or electrostatic particles and microencapsulated electrophoretic material. First display electrode 454 is coupled via conductor 460 to second tag antenna element 430 and second display electrode 456 is coupled via conductor 462 to first tag electrode 428.

Display 440 acts generally as a capacitor, and in the presence of an exciter signal, a electric potential is developed between first display electrode 454 and second display electrode 456 with electrooptic display 458 acting as a dielectric therebetween. This generated potential causes a migration of particles within the encapsulated dielectric fluid and thereby causing a visual transition of electrooptic display 458 from a first visual state to a second visual state. That is, when excited, the particles are attracted to second display electrode 456 and the particle color is predominantly seen. Upon removal of the excitation signal, electrooptic display 458 transitions from the second visual state to the first visual state. That is, the particles migrate back into and are obscured by the encapsulated dielectric fluid. In this manner, a visual signal indicative of the presence of the excitation signal is provided directly upon radio frequency identification tag 416. Moreover, very low power consumption is required to generate a transition from the first visual state to the second visual state. And, because the materials are printable, display 440 may be made exceedingly flat.

Figure 8:
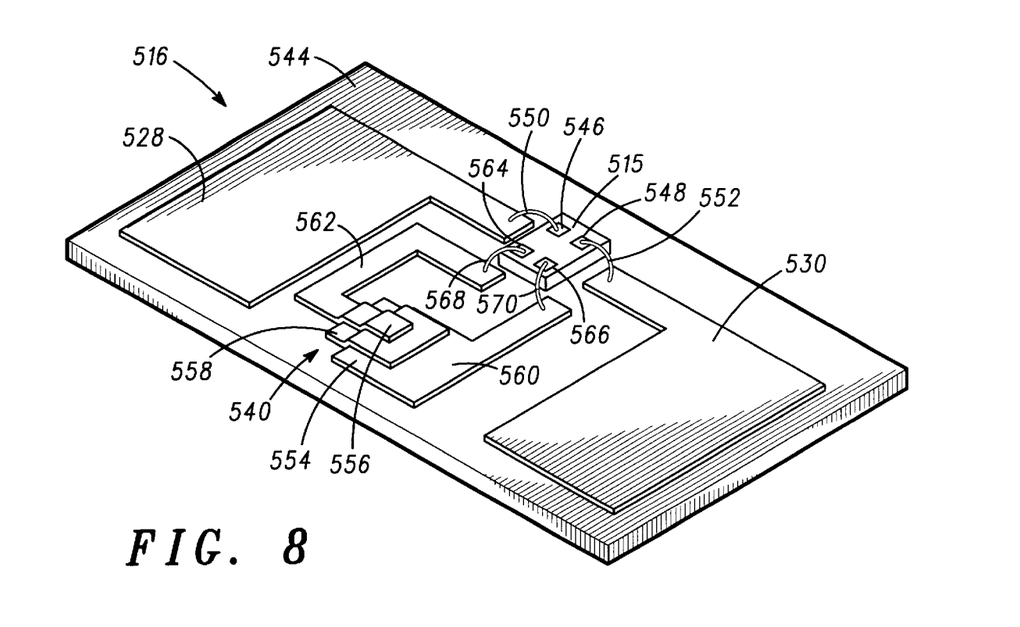
FIG. 8 is a schematic illustration of a radio frequency identification tag in accordance with an alternate preferred embodiment of the present invention.

Referring now to FIG. 8, an alternative display 540 is shown in association with radio frequency identification tag 516. It will be appreciated that the arrangement of display 540 shown in FIG. 8 may be adapted for use, as appropriate, in each of the above described radio frequency identification tags 116 and 316. As seen in FIG. 8, radio frequency identification tag 516 includes a substrate 544 to which a tag circuit 515 is secured such as by bonding. Tag circuit 515 is coupled respectively to a first tag antenna element 528 and a second tag antenna element 530 via conductive pad 546 and conductor 550 and conductive pad 548 and conductor 552, respectively, for electrostatically coupling an excitation signal from an electrostatic tag exciter and for generating and electrostatically sending a read signal to an electrostatic tag reader. In this regard, operation of radio frequency identification tag 516 is as heretofore described. Preferably each of first tag antenna element 528 and second tag antenna element 530 are printed onto substrate 544 using a suitable printing technique, such as screen or ink jet printing, and a conductive printable medium, such as conductive ink.

Display 540 is preferably a non-emissive display, which may also be printed onto substrate 544. As seen in FIG. 8, display 540 preferably includes a first display electrode 554 printed onto substrate 544. First display electrode may be a suitable printable conductive medium such as conductive ink. Printed onto first display electrode 554 is an electrooptic display 558. Electrooptic display 558 may be a layer of electrophoretic display microcapsules print-deposited onto first display electrode 554. Sandwiching electrooptic display 558 is a second display electrode 556. Second display electrode 556 is formed from a printable optically transparent conductive medium, such as an indium tin oxide (ITO) ink. Other suitable materials for forming electrooptic display 558 include encapsulated micromagnetic or electrostatic particles and microencapsulated electrophoretic elements. First display electrode 554 is coupled to conductor 560 and second display electrode 556 is coupled to conductor 562. Conductor 568 couples conductor 562 to conductive pad 564 formed on tag circuit 515 and conductor 570 couples conductor 560 to conductive pad 566 formed on tag circuit 515.

When energized, tag circuit 515 may selectively apply a dc voltage to first display electrode 554 and second display electrode 556. Application of the dc voltage develops a potential between first display electrode 554 and second display electrode 556 with electrooptic display 558 acting as a dielectric therebetween. This generated potential causes a migration of particles within the encapsulated dielectric fluid and thereby causing a visual transition of electrooptic display 558 from a first visual state to a second visual state. That is, when excited, the particles are attracted to second display electrode 556 and the particle color is predominantly seen. Upon removal of the dc voltage, electrooptic display 558 transitions from the second visual state to the first visual state. That is, the particles migrate back into and are obscured by the encapsulated dielectric fluid. In this manner, a visual signal indicative of, for example, operation of tag circuit 515, is provide directly upon radio frequency identification tag 516. Moreover, very low power consumption is required to generate a transition from the first visual state to the second visual state. And, because the materials are printable, display 540 may be made exceedingly flat.

It is possible to form first display electrode 554 as a matrix and/or to provide a non-linear backplane between conductor 560 and first display electrode 554. In this manner, electrical potentials may be applied to selective portions, or pixels, of electrooptic display 558. Utilization of a matrix addressable first display electrode 554 allows various indications of the operating status of radio frequency identification tag 516 to be generated. Moreover, electrooptic display 558 may be formed as a matrix of one or more electrophoretic materials having differing colors. This structure of electrooptic display 558, in conjunction with a matrix addressable first display electrode 554 offers numerous possibilities for providing visual indications on radio frequency identification tag 516.

In summary, referring again to FIG. 1 there has been disclosed a radio frequency identification tag 16 including a tag circuit 15, a tag common electrode 28 and a tag antenna element 30, the tag common electrode and the tag antenna element coupled to the tag circuit. The tag common electrode 28 is arranged for coupling to ground 32, and the tag antenna element 30 is arranged for electrostatically receiving an exciter signal 34 from a proximately-located electrostatic exciter 12 and coupling the exciter signal 34 to the tag circuit 15. The tag circuit 15 is arranged to become excited based on the exciter signal 34 and to generate a read signal 38 and to couple the read signal 38 to the tag antenna element 30. The tag antenna element 30 is arranged for electrostatically sending the read signal 38 to a proximately-located electrostatic reader 14. The radio frequency identification tag 16 also includes a display 40 coupled to the tag common electrode 28 and the tag antenna element 30 and is arranged to provide a visual indication of a presence of the exciter signal 34.

In one alternative embodiment of the present invention, one or both of the tag common electrode 28 and the tag antenna element 30 are arranged to magnetically store tag electrode status information. The tag electrode status information may be detected by a proximately-located magnetic reader and used for electronic article surveillance. In still another alternate embodiment of the present invention the tag circuit 15 is arranged to include a programmable on/off tag circuit state and to generate the read signal 34 responsive to the tag circuit state. Detection of the presence of the read signal 34 provides an early indication of the tag circuit state status and may also be used for providing an electronic article surveillance function.

Referring to FIG. 7, a preferred display 440 is a non-emissive display including an electrooptic display 458 disposed between a first display electrode 454 and a second display electrode 456. The electrooptic display 458 is preferably formed using a microencapsulated electrophoretic material. The display may then be coupled to each of the tag common electrode 428 and the tag antenna element 430 for providing an indication of a presence of the exciter signal 34.

Referring to FIG. 8, in an alternate arrangement, the display 540 may be coupled to the tag circuit chip 515. In this arrangement, the tag circuit chip 515 provides signals to display 540 for selectively indicating at least one operating state of the radio frequency identification tag 516.

Some advantages of the invention will now be discussed.

A radio frequency identification tag arranged in accordance with preferred embodiments of the present invention advantageously provides the tag user a visual indication of tag operation at the tag. The user need not refer to, or even attempt to locate, the exciting base station.

The preferred displays are small, thin and have very low power requirements. The preferred displays are also formed using printing techniques thereby greatly simplifying manufacturing operations.

An additional advantage of radio frequency identification tags arranged in accordance with the present invention to include displays is that virtually any number of operating modes may be indicated to the tag user by selectively energizing the display elements.

Many changes and modifications could be made to the invention without departing from the fair scope and spirit thereof. The scope of some changes is discussed above. The scope of others will become apparent from the appended claims.

I claim:

1. A radio frequency identification tag comprising a tag circuit, a tag common electrode and a tag antenna element, the tag common electrode and the tag antenna element coupled to the tag circuit, the tag common electrode arranged for coupling to an external ground;

the tag antenna element arranged for electrostatically receiving an exciter signal capacitively from an exciter and capacitively coupling the exciter signal to the tag circuit;

the tag circuit arranged for becoming excited based on the exciter signal, generating a read signal and capacitively coupling the read signal to the tag antenna element;

the tag antenna element arranged for electrostatically sending the read signal capacitively to a reader; and a display coupled to the tag common electrode and the tag antenna element and arranged to be responsive to a presence of the exciter signal, wherein the display is printable onto the radio frequency identification tag.

2. The radio frequency identification tag of claim 1, the display being a non-emissive display.

3. The radio frequency identification tag of claim 1, the display including an electrooptic display disposed between a first display electrode and a second display electrode.

4. The radio frequency identification tag of claim 3, the electrooptic display comprising a microencapsulated electrophoretic material.

5. The radio frequency identification tag of claim 3, wherein the first display electrode and the second display electrode are printed onto the radio frequency identification tag.

6. The radio frequency identification tag of claim 1, the tag common electrode further arranged for coupling to an article.

7. The radio frequency identification tag of claim 6, the tag common electrode further arranged for coupling to ground by means of the article.

8. The radio frequency identification tag of claim 1, the tag common electrode arranged for coupling to an animal or a person.

9. The radio frequency identification tag of claim 8, the tag common electrode arranged for coupling to ground by means of one of the animal or the person.

10. A radio frequency identification tag comprising a tag circuit, a tag common electrode and a tag antenna element, the tag common electrode and the tag antenna element coupled to the tag circuit;

the tag common electrode arranged for coupling to an external ground;

the tag antenna element arranged for electrostatically receiving an exciter signal capacitively from an exciter and capacitively coupling the exciter signal to the tag circuit;

the tag circuit arranged for becoming excited based on the exciter signal, generating a read signal and coupling the read signal to the tag antenna element;

the tag antenna element arranged for electrostatically sending the read signal capacitively to a reader; and a display coupled to the tag circuit and arranged to be responsive to signals from the tag circuit, wherein the display is printable onto the radio frequency identification tag.

11. The radio frequency identification tag of claim 10, the display being a non-emissive display.

12. The radio frequency identification tag of claim 10, the display including an electrooptic display disposed between a first display electrode and a second display electrode.

13. The radio frequency identification tag of claim 12, the electrooptic display comprising a microencapsulated electrophoretic material.

14. The radio frequency identification tag of claim 10, wherein the first display electrode and the second display electrode are printed onto the radio frequency identification tag.

15. The radio frequency identification tag of claim 12, the first display electrode comprising a matrix arranged to apply an electric potential to selective pixels of the electrooptic display.

16. The radio frequency identification tag of claim 10, the tag common electrode further arranged for coupling to an article.

17. The radio frequency identification tag of claim 16, the tag common electrode further arranged for coupling to ground by means of the article.

18. The radio frequency identification tag of claim 10, the tag common electrode arranged for coupling to an animal or a person.

19. The radio frequency identification tag of claim 18, the tag common electrode arranged for coupling to ground by means of one of the animal or the person.

* * * * *